J. A. ULLMAN.
STORAGE TANK.
APPLICATION FILED JAN. 5, 1911.
1,012,937.
Patented Dec. 26, 1911.
2 SHEETS—SHEET 2.
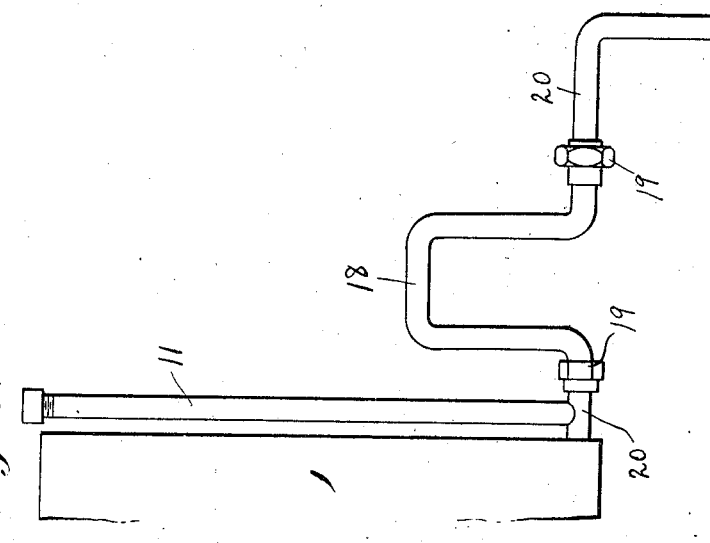
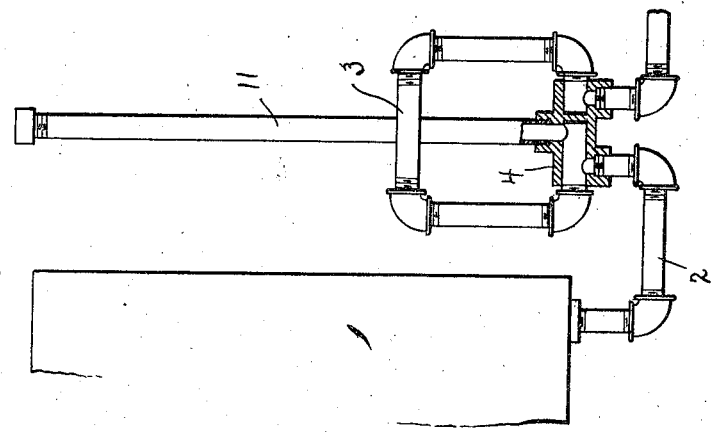
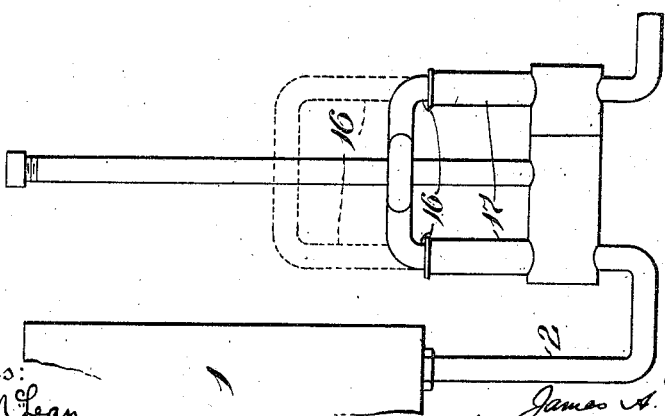
Witnesses:
Philip S. McLean.
Teresa V. Lynch.
Inventor
James A. Ullman
By his Attorney:
Brock Beckenbaugh

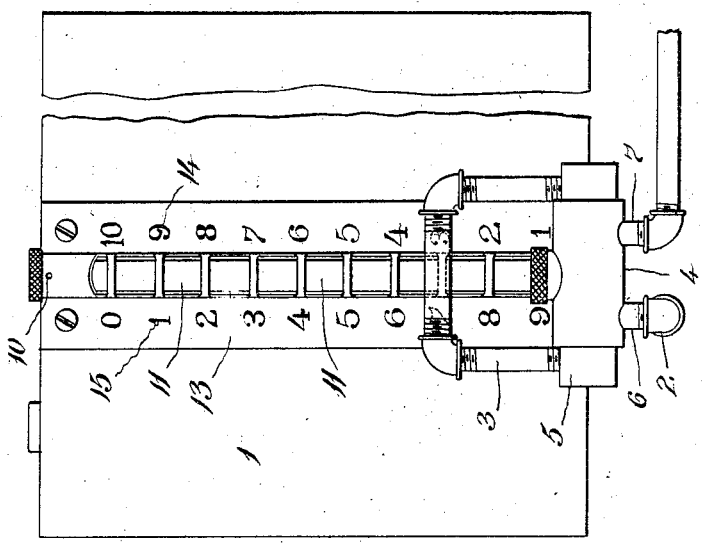
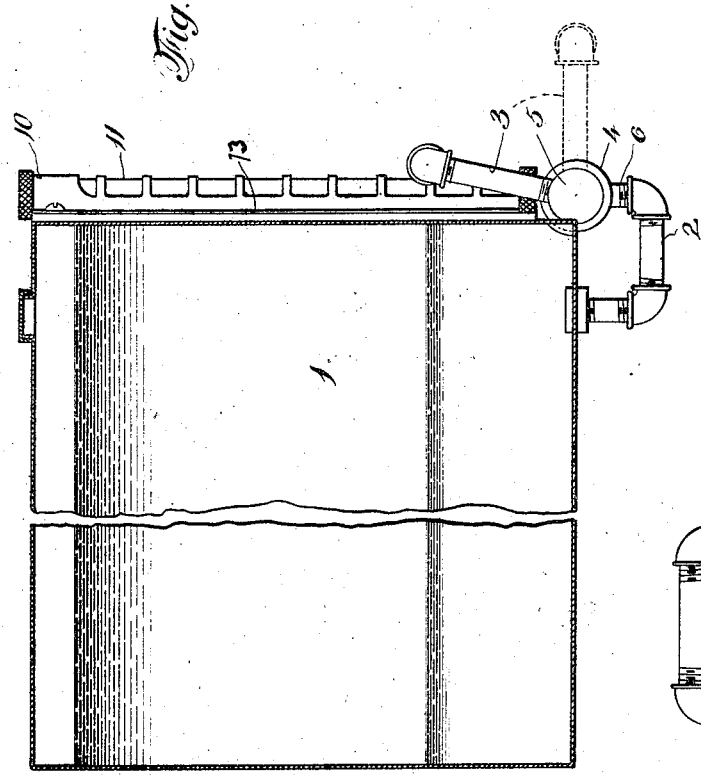
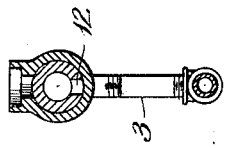
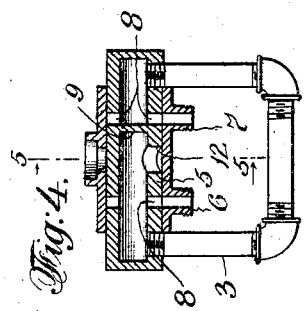
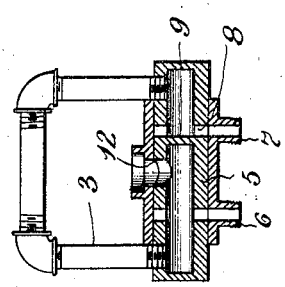

UNITED STATES PATENT OFFICE.

JAMES A. ULLMAN, OF NEW YORK, N. Y.

STORAGE-TANK.

1,012,937.      Specification of Letters Patent.      Patented Dec. 26, 1911.

Application filed January 5, 1911. Serial No. 601,007.

*To all whom it may concern:*

Be it known that I, JAMES A. ULLMAN, a citizen of the United States, and a resident of the borough of Manhattan, in the county of New York, city and State of New York, have invented certain new and useful Improvements in Storage-Tanks, of which the following is a specification.

My invention has particular reference to the storage tanks of automobiles, motor boats, and the like, and the object of the invention is to give warning of the near exhaustion of the liquid fuel and at the same time to provide a reserve supply of fuel, available for use after the main supply is exhausted. The invention is, however, not limited to this particular use.

Another object of the invention is to give knowledge of the amount of liquid or fuel in the tank, and in some cases to show the amount of liquid which has been used or withdrawn from the tank.

In its preferred form the invention consists of a storage tank and outlet conduit leading therefrom, the outlet conduit having its highest point normally disposed above the level of the bottom of the tank, so that the liquid will flow through the conduit until the level in the tank reaches the level of the conduit, whereby a portion of the liquid will be held in reserve in the bottom of the tank, and the conduit being adapted then to be lowered so as to permit this "reserve supply" to be used. The outlet conduit may be in the form of simple pipe connections and the height of the conduit may be raised and lowered with respect to the bottom of the tank by interposing a movable arched portion in the pipe connections. This arched portion, which regulates the true height of the conduit and thus determines the amount of the reserve supply, may be swiveled or otherwise connected in the outlet pipe or conduit so as to permit of the required movement. If no provision to the contrary were made, the arched portion of the conduit might act as a siphon to drain the tank of its contents. Means are provided therefore to obviate any siphonage tendency. This result may be and preferably is attained by placing a vent in the pipe connections which form the outlet from the tank. This vent must of course be located at a point higher, or at least as high as the highest point reached by the liquid in the tank, and for this reason the vent may be carried in the top of a stand pipe which is in connection with the pipe connections and rises to a point approximately as high as the top of the tank. This vent would ordinarily open to the atmosphere, but when a pressure system is employed, the vent would open into the top portion of the tank, substantially as shown in a co-pending application of mine Serial No. 528,327.

Another feature of my invention consists in utilizing this stand pipe as a gage for indicating the contents of the tank. I prefer therefore to make the stand pipe of a tube of glass or other transparent material, and associate with this transparent tube, a gage or scale plate having suitable indications thereon. Two such sets of indications are preferably placed on the gage plate, one set denoting the amount of liquid in the tank, and the other set denoting the amount of liquid which has been withdrawn from the tank.

Still another object of my invention is to insure of the parts being properly positioned, each time the tank is filled, to maintain a reserve supply in the tank. This object I preferably attain by providing coöperative passages between the stand pipe and the movable part of the pipe connections, so that communication with the stand pipe will be cut off when the movable part or "arched portion" of the pipe connections is moved to permit use of the reserve supply. Then the next time the tank is filled, the arched portion will have to be turned up to the reserve holding position in order to open communication to the stand pipe and permit the inflowing liquid to register on the gage.

Various other features will appear as the specification proceeds.

My invention is capable of many modifications, and while I have illustrated in the accompanying drawings several preferred embodiments of the same, it will be understood that various changes and modifications may be made therefrom without departing from the spirit and scope of the invention.

In the drawings: Figure 1 is a side elevation of my invention as applied to a tank, the tank being shown in section. The full lines indicate the reserve holding position of the device and the dotted lines indicate the lowered position in which the reserve supply is being drawn off. Fig. 2 is a front elevation of this form of the invention. Fig. 3 is a detail sectional view showing the movable member in the upper reserve holding position. Fig. 4 is a like view of the same with the movable member in the lowered position. Fig. 5 is a cross-sectional view taken on the line 5—5 of Fig. 4. Fig. 6 is a view in elevation of a modified form of the invention. Fig. 7 is a view partially in section of a modified form of the invention. Fig. 8 is a view of another modification.

Like reference characters refer to like parts throughout the several views.

No special form of tank is necessary with my invention and I have therefore shown the invention as applied to a tank 1 of ordinary construction. The outlet conduit or pipe connections 2 are connected with either the bottom or the lower portion of the tank and extend to the engine or other point of consumption. In these pipe connections there is disposed a movable part, preferably in the form of an arched member or portion 3, the said member adapted to be raised and lowered with respect to the bottom of the tank. To permit of this movement, this member is suitably jointed to the pipe connections. This joint may be made by means of a swiveled connection, as shown in the first five figures, or any other suitable form of joint may be employed, such as the telescoping connection shown in Fig. 6. In the first instance, the joint may be effected by providing a stationary member 4 in which a cylindrical portion 5 of the arched member is revolubly received. An inlet 6 and an outlet 7 are provided in the stationary fixture 4, and openings or ports 8 are provided in the revoluble portion of the movable member communicating with the said inlet and outlet. A partition or wall 9 is formed in the journal portion of the movable member to prevent the liquid flowing from the inlet to the outlet without first passing all the way through the member.

Under ordinary running conditions, the movable member or arched portion stands in its upper position so that the liquid is forced to traverse the loop or arch before passing to the outlet. When the liquid in the tank falls to the level of the top of the arched portion, it will, in the absence of siphonage action, cease flowing, thereby giving warning to the operator of the near exhaustion of the liquid. The movable member is then turned to its lower position, in which position the maximum height of the conduit is substantially even with the bottom of the tank. This permits the reserve supply of fuel or liquid to flow out through the conduit. The arched portion need not be turned all the way down—it may be turned only ninety degrees, as shown in dotted lines in Fig. 1.

As before stated, the outlet conduit is preferably provided with a vent 10 to obviate any tendency toward siphonage action. This vent is, as shown, preferably placed in the top of a stand pipe 11, which stand pipe rises to a level substantially even with the top of the tank. A convenient method of mounting the stand pipe is to have it carried by the stationary fixture 4, as shown.

When the arched portion is in its normal upper position, the liquid flows to the stand pipe by way of the port 12 in the revoluble part of the movable member. This port is preferably so disposed that when the movable member is turned down to permit use of the reserve supply, communication to the stand pipe will be cut off. This necessitates the movable member being turned up to the reserve-holding position before the liquid can register in the gage glass. When filling the tank, therefore, before the amount of liquid in the tank can be ascertained, it is necessary to turn the arched portion up to the reserve-holding position.

Associated with the transparent stand pipe there is a scale or gage plate 13. The gage plate is preferably provided on one side with a set of indications 14 denoting the amount of liquid in the tank, and with a set of indications 15 on the other side serving to denote the amount of liquid which has been withdrawn from the tank.

In Fig. 6 I have illustrated a modification of my invention in which the raising and lowering of the outlet conduit is accomplished by making the arched portion with two parallel side members 16 in sliding engagement with the cylindrical members 17 disposed in the conduit connections. The reserve supply is held and released with this form of the invention the same as in the form just described. If desired also, an interlocking arrangement may be devised with this form, whereby the arched portion will have to be raised to its reserve holding position before the liquid can flow to the gage.

Various other forms of interlocking devices, whereby the device is rendered completely operative only after the reserve holding means has been set in proper position, may be devised. I have shown my invention as attached directly to the tank itself, but the position of the device may of course be varied to suit different conditions. For instance, it might be mounted on the dashboard of an automobile.

The modified form of the invention illustrated in Fig. 7 is very much similar to the one shown in Figs. 1 and 2 except that here parts are shown in section to better illustrate the circulation of the fluid.

In the modification illustrated in Fig. 8, the movable portion consists simply of a looped member 18 which has its ends swiveled at 19 in the stationary pipe connections 20. The action of this form of device is the same as already described.

What is claimed, is:

1. In combination with a storage tank, means for maintaining a reserve supply of fluid therein, comprising pipe connections forming an outlet from the tank, the said pipe connections normally rising to a point above the level of the bottom of the tank whereby the liquid will flow through the pipe connections until the liquid in the tank reaches the level of the highest point of the pipe connections, whereby a reserve supply is created in the bottom of the tank, a stand pipe rising from the pipe connections and provided with a vent in its upper end to prevent siphonage, and the said pipe connections adapted to be lowered to a lower level to permit the reserve supply in the bottom of the tank to flow through the pipe connections.

2. In combination with a storage tank, pipe connections forming an outlet therefrom, a stand pipe rising from the pipe connections, provided with a vent in its upper end, and a movable part in the said pipe connections adapted to be raised and lowered with respect to the bottom of the tank.

3. In combination with a storage tank, pipe connections forming an outlet therefrom, a transparent stand pipe for indicating the contents of the tank, rising from the pipe connections and normally in communication therewith, means for shutting off the stand pipe from communication with the pipe connections, and the pipe connections adapted to be moved for altering the level of the pipe connections.

4. In combination with a storage tank, pipe connections forming an outlet therefrom, and adapted to be raised and lowered to change the level of such pipe connections, a stand pipe serving as a gage to indicate the contents of the tank, rising from the pipe connections and normally in communication therewith, and means for establishing and cutting off communication between the pipe connections and stand pipe simultaneously with the raising and the lowering of the pipe connections.

5. In combination with a storage tank, pipe connections from the tank, rising normally to a point above the level of the bottom of the tank, a transparent stand pipe for indicating the contents of the tank, rising from the pipe connections and provided with a vent in its upper end, said stand pipe being normally in communication with the pipe connections, the said pipe connections being movable for the purpose of lowering the level of the pipe connections, and means for shutting off communication between the pipe connections and stand pipe simultaneously with the movement of the pipe connections.

6. In combination, a storage tank, pipe connections leading therefrom, an arched portion movably disposed in the said pipe connections, capable of being raised and lowered, and said pipe connections being provided with a vent to prevent siphonage through the arched portion aforesaid.

7. In combination, a storage tank, pipe connections leading therefrom, an arched portion swiveled in said pipe connections to permit of its being raised and lowered with respect to the bottom of the tank, a stand pipe connected with the arched portion, and the said stand pipe being provided with a vent to prevent siphonage through the arched portion aforesaid.

8. In combination, a storage tank, pipe connections leading therefrom, an arched portion movably disposed in the said pipe connections, capable of being raised and lowered, and means for preventing siphonage action through the arched portion aforesaid.

9. In combination, a storage tank, pipe connections leading therefrom, an arched portion swiveled in said pipe connections to permit of its being raised and lowered with respect to the bottom of the tank, and a stand pipe rising from the pipe connections provided with a vent in its upper end.

10. In combination, a storage tank, pipe connections leading therefrom, a stand pipe forming a gage for indicating the contents of the tank, rising from the said pipe connections, an arched portion connected in the pipe connections by a swivel joint to permit of its being raised and lowered with respect to the bottom of the tank, and passages controlled by said swiveled arched portion whereby as said arched portion is moved in one direction, communication will be established between the stand pipe and pipe connections and when the arched portion is moved in the opposite direction, communication will be shut off between the stand pipe and pipe connections.

11. The combination with a storage tank, of means for maintaining a reserve supply of liquid therein comprising pipe connections leading from the bottom of the tank, the said pipe connections having a movable part located outside the tank normally extending to a point above the level of the bottom of the tank so that the liquid will flow through the pipe connections until the liquid in the tank reaches the level of the highest part of the pipe connections, thus creating a reserve supply in the bottom of the tank, and the movable part adapted when lowered to permit the reserve supply to flow through the same and means for preventing siphonage action through the movable part of the pipe connections when it is in its elevated position.

Signed at New York city, in the county of New York and State of New York this thirty-first day of December A. D. 1910.

JAMES A. ULLMAN.

Witnesses:
ALBERT NATHAN,
L. H. FREUND.